(12) United States Patent
Vondrigalski et al.

(10) Patent No.: US 12,269,165 B2
(45) Date of Patent: Apr. 8, 2025

(54) ROBOT CONTROL APPARATUS, ROBOT CONTROL SYSTEM, ROBOT CONTROL METHOD, AND COMPUTER-READABLE STORAGE MEDIUM STORING A ROBOT CONTROL PROGRAM

(71) Applicant: OMRON Corporation, Kyoto (JP)

(72) Inventors: Felix Vondrigalski, Tokyo (JP); Yoshihisa Ijiri, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 306 days.

(21) Appl. No.: 17/788,784

(22) PCT Filed: Dec. 22, 2020

(86) PCT No.: PCT/JP2020/047801
§ 371 (c)(1),
(2) Date: Jun. 24, 2022

(87) PCT Pub. No.: WO2021/140902
PCT Pub. Date: Jul. 15, 2021

(65) Prior Publication Data
US 2023/0046793 A1 Feb. 16, 2023

(30) Foreign Application Priority Data
Jan. 8, 2020 (JP) .................. 2020-001494

(51) Int. Cl.
B25J 9/16 (2006.01)
B25J 13/08 (2006.01)

(52) U.S. Cl.
CPC ............. *B25J 9/1653* (2013.01); *B25J 9/161* (2013.01); *B25J 9/1697* (2013.01); *B25J 13/085* (2013.01)

(58) Field of Classification Search
CPC ........ B25J 9/1653; B25J 9/161; B25J 9/1697; B25J 13/085; B25J 9/1666;
(Continued)

(56) References Cited

U.S. PATENT DOCUMENTS 9,981,382 B1 * 5/2018 Strauss .................. B25J 9/1697
11,498,210 B2 * 11/2022 Oka ........................ B25J 9/1653
(Continued)

FOREIGN PATENT DOCUMENTS

DE 102006036489 A1 * 2/2008 ............ B25J 9/1671
EP 3120979 A1 * 1/2017 ............ A61B 34/30
(Continued)

OTHER PUBLICATIONS

JP-2017087325-A translation (Year: 2017).*
(Continued)

*Primary Examiner* — Kyle T Johnson
(74) *Attorney, Agent, or Firm* — METROLEX IP LAW GROUP, PLLC; Robert L. Scoff, Esq.

(57) ABSTRACT

A robot control apparatus according to one or more embodiments may include: a calculating unit configured to calculate an interference range of a robot based on a model of the robot in a state in which an object is gripped by a gripper with which the robot is equipped; and a planning unit configured to plan a motion of the robot based on the model and the interference range.

20 Claims, 4 Drawing Sheets

(58) Field of Classification Search
CPC ........... G05B 2219/40323; G05B 2219/40476; G05B 2219/40586; G05B 2219/40609
See application file for complete search history.

(56) References Cited

U.S. PATENT DOCUMENTS

| | | | |
|---|---|---|---|
| 2002/0169522 A1 | 11/2002 | Kanno | |
| 2004/0138779 A1* | 7/2004 | Shibata | B25J 9/1666 700/264 |
| 2011/0153076 A1* | 6/2011 | Noro | B25J 9/1664 700/245 |
| 2012/0004774 A1* | 1/2012 | Umetsu | B25J 9/1697 700/254 |
| 2015/0306767 A1* | 10/2015 | Saito | B25J 9/162 901/1 |
| 2016/0214143 A1 | 7/2016 | Nagatsuka | |
| 2016/0297071 A1* | 10/2016 | Nammoto | B25J 9/1664 |
| 2018/0250822 A1* | 9/2018 | Shimodaira | B25J 9/1697 |
| 2018/0250823 A1* | 9/2018 | Shimodaira | B25J 9/1612 |
| 2019/0291277 A1* | 9/2019 | Oleynik | B25J 9/1669 |
| 2019/0375602 A1 | 12/2019 | Katagiri et al. | |
| 2020/0198130 A1* | 6/2020 | Goldberg | B25J 9/1697 |
| 2020/0391377 A1* | 12/2020 | Yoneyama | B25J 9/1664 |
| 2020/0391385 A1* | 12/2020 | Oka | B25J 9/1666 |
| 2022/0032454 A1* | 2/2022 | Yang | G06V 10/764 |
| 2022/0072707 A1* | 3/2022 | Fan | G06T 7/73 |
| 2023/0046793 A1* | 2/2023 | Vondrigalski | B25J 9/161 |

FOREIGN PATENT DOCUMENTS

| | | | | |
|---|---|---|---|---|
| JP | 2011-131300 A | | 7/2011 | |
| JP | 2012-11531 A | | 1/2012 | |
| JP | 2016-137551 A | | 8/2016 | |
| JP | 2017-87325 A | | 5/2017 | |
| JP | 2017087325 A | * | 5/2017 | |
| KR | 100865165 B1 | * | 10/2008 | ........... B25J 9/1669 |
| WO | 2016/151862 A1 | | 9/2016 | |

OTHER PUBLICATIONS

DE-102006036489-A1 translation (Year: 2008).*
KR-100865165-B1 translation (Year: 2008).*
State of the art robotic grippers, grasping and control strategies, as well as their applications in agricultural robots: a review (Year: 2020).*
English translation of the International Search Report ("ISR") of PCT/JP2020/047801 mailed on Mar. 22, 2021.
Written Opinion ("WO") of PCT/JP2020/047801 mailed on Mar. 23, 2021.
Extended European search report (EESR) issued on Jul. 26, 2023 in a counterpart European patent application.

* cited by examiner

ROBOT CONTROL APPARATUS, ROBOT CONTROL SYSTEM, ROBOT CONTROL METHOD, AND COMPUTER-READABLE STORAGE MEDIUM STORING A ROBOT CONTROL PROGRAM

TECHNICAL FIELD

The disclosure relates to a robot control apparatus, a robot control system, a robot control method, and a computer-readable storage medium storing a robot control program.

RELATED ART

Heretofore, robots are used for assembling and processing products. A robot includes one or more arms, and has an end effector such as a hand at an arm's leading end.

For example, a robot that grips or retains a scraping tool and a robot control apparatus that controls the robot are described in Patent Document 1 below. The robot is an articulated robot, and includes a robot arm, and a robot hand attached to a leading end of the robot arm. The scraping tool is gripped or retained by the robot hand.

RELATED ART DOCUMENT

Non-Patent Document

Patent Document 1: JP 2016-137551A

SUMMARY

When a predetermined tool is retained by a robot that specializes in retaining predetermined tools, as in Patent Document 1, there are cases where a tool changer is used. As a result of using the tool changer, a plurality of tools can be used as appropriate.

However, when a task of changing the tool to be gripped, out of a plurality of tools, is performed relatively frequently, it takes time to change the tool when the tool changer is used. On the other hand, if a tool is gripped by a gripper, the time required to switch the tool can be reduced, however, there is a risk that the tool interferes with the surrounding environment when the tool to be gripped changes, because the size and length are different between the plurality of tools, for example. Also, even if the same tool is used, the gripping position and orientation of the tool gripped by the gripper may change, and therefore, there is a risk that the tool interferes with the surrounding environment.

Therefore, one or more embodiments may aim to provide a robot control apparatus, a robot control system, a robot control method, and a computer-readable storage medium storing a robot control program, with which the risk that an object interferes with the surrounding environment may be reduced, even when the object is gripped by a gripper equipped in the robot.

A robot control apparatus according to one or more embodiments may include: a calculating unit configured to calculate an interference range of a robot based on a model of the robot in a state in which an object is gripped by a gripper equipped in the robot; and a planning unit configured to plan a motion of the robot based on the model and the interference range.

According to one or more embodiments, as a result of calculating the interference range of the robot based on a model of the robot in a state in which an object is gripped by the gripper, the risk that the object interferes with the surrounding environment may be reduced, even when the object is gripped.

The robot control apparatus may further include an estimating unit configured to estimate the type of the object gripped by the gripper, and the calculating unit may update the model based on the type of the object.

According to one or more embodiments, the type of the object that may change every time gripping is performed is estimated, an accurate model is created, and as a result, the interference range of the robot may be accurately calculated.

A robot control apparatus according to one or more embodiments may further include an estimating unit configured to estimate the orientation of the object gripped by the gripper, and the calculating unit may update the model based on the orientation of the object.

According to one or more embodiments, the orientation of the object, which may change every time gripping is performed, is estimated, a more accurate model is created, and as a result, the interference range of the robot may be more accurately calculated.

The robot may include a camera, and the estimating unit may estimate the type or orientation of the object based on an image of the object shot by the camera.

According to one or more embodiments, the type or orientation of the object, which may change every time gripping is performed, is estimated based on an image, a more accurate model is created, and as a result, the interference range of the robot may be more accurately calculated.

A robot according to one or more embodiments may include a force sensor provided in the gripper, and the estimating unit may estimate the type or orientation of the object based on a detection signal of the force sensor.

According to one or more embodiments, the type or orientation of the object, which may change every time gripping is performed, is estimated based on a detection signal of the force sensor, a more accurate model is created, and as a result, the interference range of the robot may be more accurately calculated.

The estimating unit may cause the object to interfere with its environment in a state in which the object is gripped by the gripper, and estimate the type or orientation of the object based on an interference result.

According to one or more embodiments, the type or orientation of the object, which may change every time gripping is performed, is estimated by causing the object interfere with its environment, a more accurate model is created, and as a result, the interference range of the robot may be more accurately calculated.

The object according to one or more embodiments may be a tool.

According to one or more embodiments, as a result of calculating the interference range of the robot based on a model of the robot in a state in which a tool is gripped by the gripper, the risk that the object interferes with the surrounding environment may be reduced, even if various tools are used.

A robot control system according to: one or more embodiments may include a robot equipped with a gripper for gripping an object; and a robot control apparatus configured to control the robot, wherein the robot control apparatus includes: a calculating unit configured to calculate an interference range of the robot based on a model of the robot in a state in which an object is gripped by the gripper equipped in the robot; and a planning unit configured to plan a motion of the robot based on the model and the interference range.

According to one or more embodiments, as a result of calculating the interference range of the robot based on a model of the robot in a state in which an object is gripped by the gripper, the risk that the object interferes with the surrounding environment may be reduced, even when the object is gripped.

A robot control method according to one or more embodiments may include a method for causing a processor included in a robot control apparatus to execute: calculating an interference range of a robot based on a model of the robot in a state in which the robot grips an object using a gripper; and planning a motion of the robot based on the model and the interference range.

According to one or more embodiments, as a result of calculating the interference range of the robot based on a model of the robot in a state in which an object is gripped by the gripper, the risk that the object interferes with the surrounding environment may be reduced, even when the object is gripped.

A robot control program according to one or more embodiments may include a computer readable medium storing a program for causing a processor included in a robot control apparatus to function as: a calculating unit configured to calculate an interference range of a robot based on a model of the robot in a state in which an object is gripped by a gripper equipped in the robot; and a planning unit configured to plan a motion of the robot based on the model and the interference range.

According to one or more embodiments, as a result of calculating the interference range of the robot based on a model of the robot in a state in which an object is gripped by the gripper, the risk that the object interferes with the surrounding environment may be reduced, even when the object is gripped.

According to one or more embodiments the present invention, a robot control apparatus, a robot control system, a robot control method, and a computer-readable storage medium storing a robot control program may be provided, with which the risk that an object interferes with the surrounding environment may be reduced, even when the object is gripped by a gripper with which the robot is equipped.

DETAILED DESCRIPTION

An embodiment of the present invention will be described with reference to the accompanying drawings. Note that in the drawings, constituent elements denoted by the same reference numerals have the same or similar configurations.

1. Application Example

Figure 1:
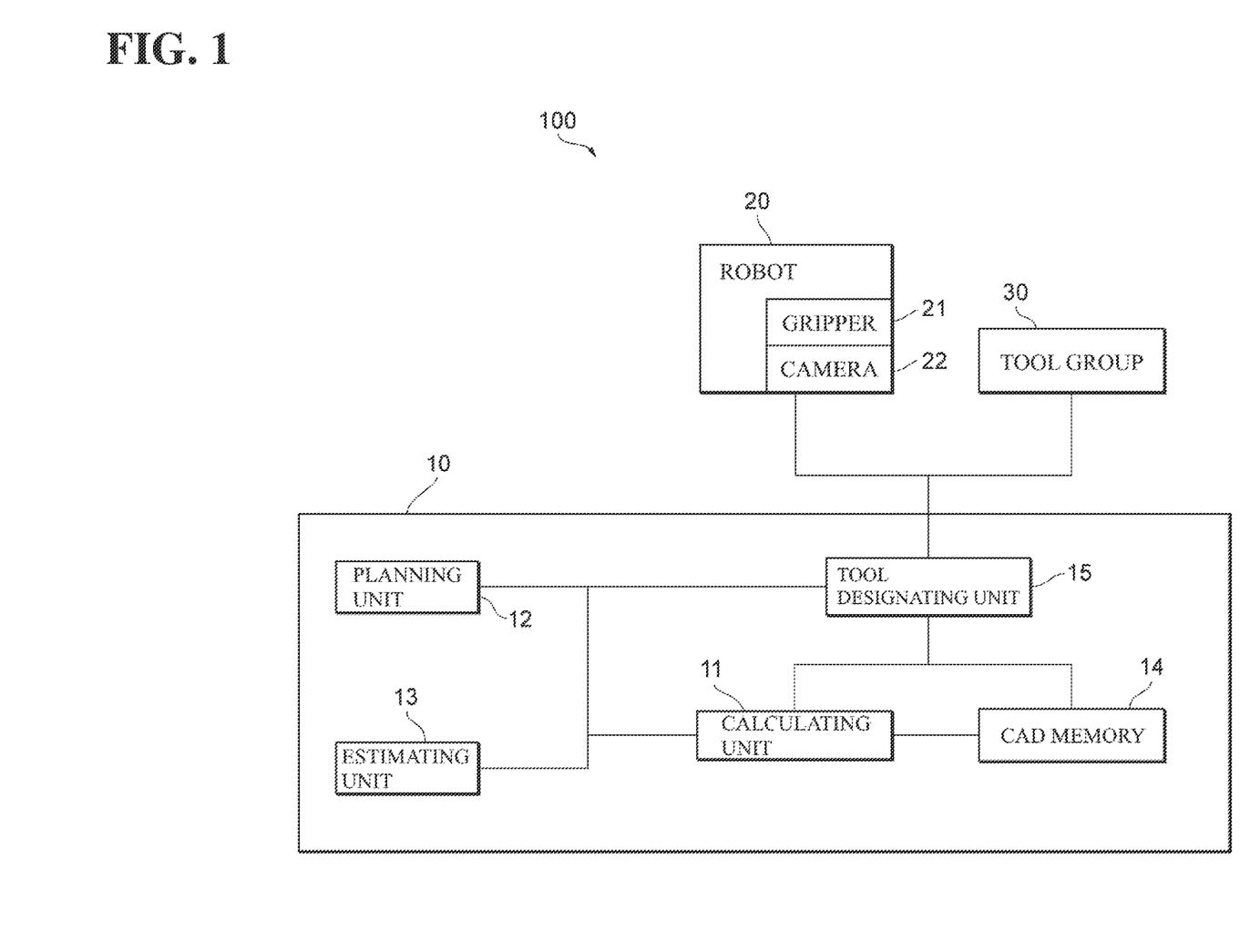
FIG. 1 is a diagram illustrating functional blocks of a robot control system according to one or more embodiments an embodiment of the present invention.

First, an example of a scenario to which the present invention is applied will be described using FIG. 1. FIG. 1 is a diagram illustrating functional blocks of a robot control system 100 according to an embodiment of the present invention. The robot control system 100 includes a robot 20 equipped with a gripper 21 that grips an object, and a robot control apparatus 10 that controls the robot 20. In this specification, the object may be a tool, a component, or a combination of these, and may also be a tool and a component in a state in which the component is retained at the leading end of the tool.

The robot 20 grips an object such as a tool using the gripper 21, and the robot control apparatus 10 calculates an interference range of the robot 20 based on a model of the robot 20 in a state in which the object is gripped by the gripper 21. Here, the model of the robot 20 in a state in which an object is gripped by the gripper 21 may be a three-dimensional CAD (computer-aided design) model, for example. The robot control apparatus 10 plans the motion of the robot 20 based on the model of the robot 20 and the calculated interference range. The motion of the robot 20 may be a motion in which the gripped tool is used, for example.

According to the robot control apparatus 10 according to the present embodiment, as a result of calculating the interference range of the robot 20 based on the model of the robot 20 in a state in which an object is gripped by the gripper 21, the risk that the object interferes with the surrounding environment can be reduced, even in a case of an object being gripped.

2. Exemplary Configuration

[Functional Configuration]

The robot control apparatus 10 includes a calculating unit 11, a planning unit 12, an estimating unit 13, a CAD memory 14, and a tool designating unit 15.

<Calculating Unit>

The calculating unit 11 calculates the interference range of the robot 20 based on a model of the robot 20 in a state in which an object is gripped by the gripper 21 with which the robot 20 is equipped. The model of the robot 20 may be a three-dimensional CAD model, and may be a model for simulating the motion of the robot 20 in a virtual space. A model in which the robot 20 and the object are included may be defined when the object is gripped using the gripper 21. The calculating unit 11 may calculate the leading end position of the object gripped by the gripper 21 from the angles of a plurality of joints that are part of the robot 20 using forward kinematics. The calculating unit 11 may also calculate the angles of the plurality of joints that are part of the robot 20 from the leading end position of the object gripped by the gripper 21 using inverse kinematics.

<Planning Unit>

The planning unit 12 plans the motion of the robot 20 based on the model and interference range of the robot 20. The planning unit 12 plans the motion of the robot 20 such that the arm that constitutes the robot 20 and the object gripped by the gripper 21 will not interfere with its environment. Here, the environment encompasses structures that are arranged around the robot 20 and the robot 20 itself.

When the object is a tool, the motion of the robot 20 may be a motion of using the tool gripped by the gripper 21. The tool may be a screwdriver, a soldering iron, or tweezers, for example, and the motion of using a tool may be a screw fastening motion, a soldering motion, and a motion of pinching a component using tweezers. As described above, as a result of calculating the interference range of the robot 20 based on the model of the robot 20 in a state in which a tool is gripped by the gripper 21, even if various tools are to be used, the risk that the object interferes with the surrounding environment can be reduced.

<Estimating Unit>

The estimating unit 13 estimates the type of object gripped by the gripper 21. For example, when the object is a tool, the type of the object is the type of tool such as a screwdriver, a soldering iron, or tweezers. The calculating unit 12 may update the model based on the type of the object. In this way, the type of an object that may change every time gripping is performed is estimated, an accurate model is created, and as a result, the interference range of the robot 20 can be accurately calculated.

The estimating unit 13 estimates the orientation of an object in a state in which the object is gripped by the gripper 21. Here, the orientation of an object includes its position (x, y, z) in a narrow sense and its orientation ($\phi$, $\theta$, $\psi$) in a narrow sense. Also, the orientation of an object may also be defined relative to the gripper 21. The calculating unit 12 may update the model based on the orientation of the object. In this way, the orientation of the object, which may change every time gripping is performed, is estimated, a more accurate model is created, and as a result, the interference range of the robot 20 can be more accurately calculated.

The robot 20 may include a camera 22. The camera 22 may be provided to shoot (photograph) the gripper 21. The estimating unit 13 may estimate the type of the object or the orientation of the object based on an image of the object shot by the camera 22. The estimating unit 13 may estimate the type or orientation of the object by analyzing the image of the object shot by the camera 22 using a known analysis method. In this way, the type or orientation of the object, which may change every time gripping is performed, is estimated based on an image, an accurate model is created, and as a result, the interference range of the robot 20 can be accurately calculated. Note that, the camera 22 may include a depth sensor that acquires a three-dimensional point group or a depth image. In this case, the orientation of the object, which may change every time gripping is performed, is estimated based on the three-dimensional point group or depth image, a more accurate model is created, and as a result, the interference range of the robot 20 can be more accurately calculated.

The robot 20 may include a force sensor provided in the gripper 21. The force sensor may be a sensor that measures a force and a torque, and may be a six-axis force sensor, for example. The estimating unit 13 may estimate the type or orientation of the object based on a detection signal of the force sensor. In this way, the type or orientation, of an object, that may change every time gripping is performed is estimated based on a detection signal of the force sensor, a more accurate model is created, and as a result, the interference range of the robot 20 can be more accurately calculated.

The estimating unit 13 may also cause an object to interfere with its environment in a state in which the object is gripped by the gripper 21, and estimate the type or orientation of the object based on the result of interference. The estimating unit 13 may cause an object to move along a workbench in a state in which the object is gripped by the gripper 21, and estimate the type or orientation of the object based on the result of interference, for example. In this way, the type or orientation, of an object, that may change every time gripping is performed is estimated by causing the object to interfere with its environment, a more accurate model is created, and as a result, the interference range of the robot 20 can be more accurately calculated.

<CAD Memory>

The CAD memory 14 stores a three-dimensional CAD model of the robot 20, three-dimensional CAD models of a tool group 30, and three-dimensional CAD models of structures provided around the robot 20.

<Tool Designating Unit>

The tool designating unit 15 designates a tool, out of the tool group 30, that is to be used in an operation of the robot 20. The tool designating unit 15 may designate the operation of the robot 20, and select the tool needed for the operation.

[Hardware Configuration]

Figure 2:
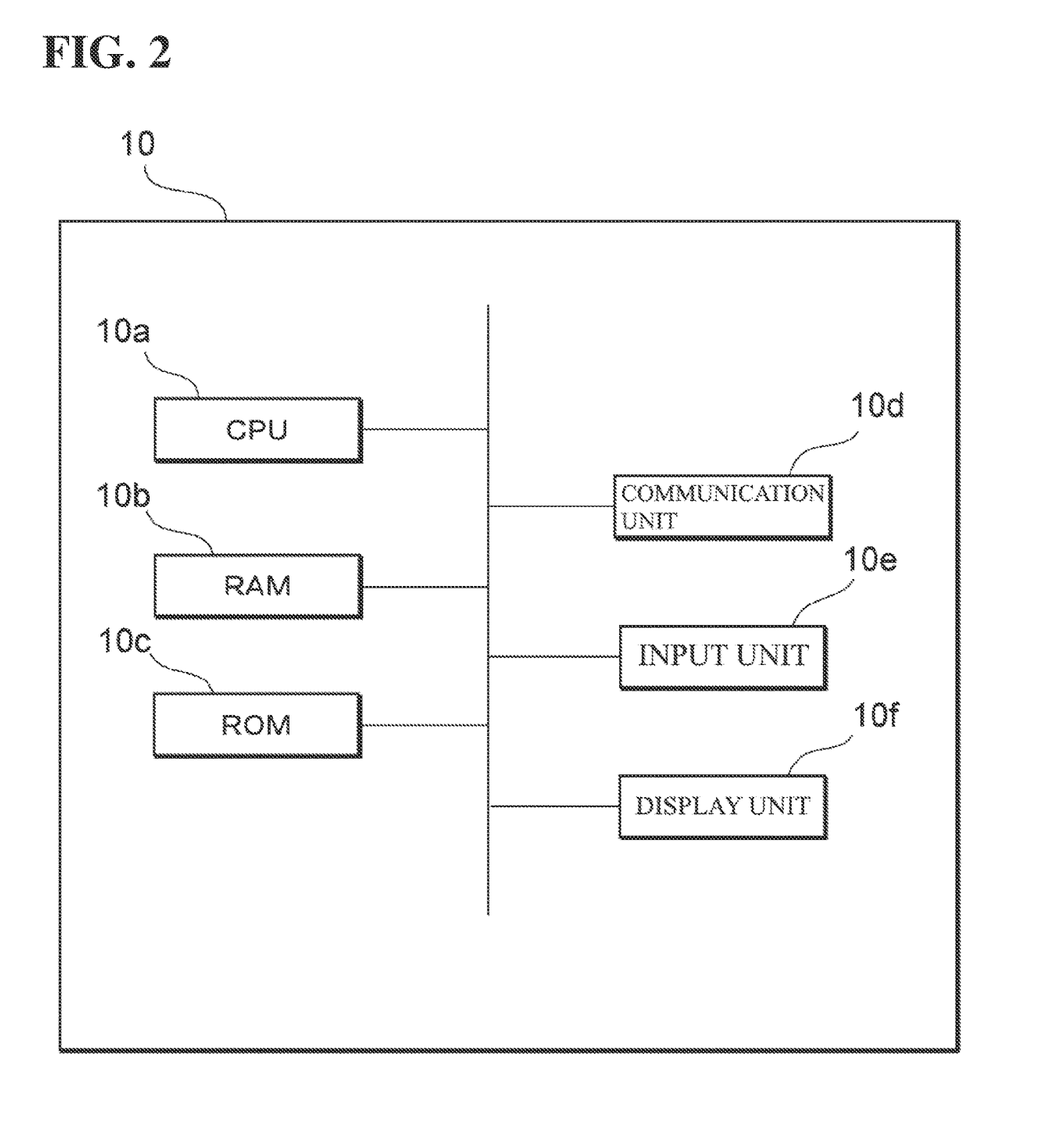
FIG. 2 is a diagram illustrating a physical configuration of a robot control apparatus according to one or more embodiments the present embodiment.

FIG. 2 is a diagram illustrating a physical configuration of the robot control apparatus 10 according to the present embodiment. The robot control apparatus 10 includes a CPU (central processing unit) 10a corresponding to a computation unit, a RAM (random access memory) 10b corresponding to a storage unit, a ROM (read only memory) 10c corresponding to the storage unit, a communication unit 10d, an input unit 10e, and a display unit 10f. These constituent elements are connected through a bus and are able to transmit and receive data to and from each other. Note that this example will describe a case where the robot control apparatus 10 is constituted by one computer, but the robot control apparatus 10 may also be realized by a plurality of computers. Also, the configuration shown in FIG. 2 is merely an example, and the robot control apparatus 10 may also include constituent elements other than those shown in FIG. 2, or may also not include some of those constituent elements.

The CPU 10a is a control unit that performs control regarding execution of programs stored in the RAM 10b or ROM 10c, and computation and processing of data. The CPU 10a is also a computation unit that executes a program for controlling the robot 20 (robot control program). The CPU 10a may receive various data from the input unit 10e and communication unit 10d, and display the data computation result in the display unit 10f, and/or store it in the RAM 10b.

The RAM 10b is a data rewritable portion of the storage unit, and may be constituted by a semiconductor memory element, for example. The RAM 10b may store data such as programs to be executed by the CPU 10a and three-dimensional CAD models of the robot 20 and tool group 30. Note that the aforementioned data is merely an example, and the RAM 10b may store data in addition to the data, or may not store some of the data.

The ROM 10c is a portion, of the storage unit, from which data can be read out, and may be constituted by a semiconductor memory element, for example. The ROM 10c may store a robot control program and data that will not be rewritten, for example.

The communication unit 10d is an interface for connecting the robot control apparatus 10 to another device. The communication unit 10d may be connected to a communication network such as the Internet.

The input unit 10e receives inputs of data from a user, and may include a keyboard and a touch panel, for example.

The display unit 10f visually displays results of computation performed by the CPU 10a, and may be an LCD (liquid crystal display), for example. The display unit 10f may display three-dimensional CAD models of the robot 20 and tool group 30, and planned motions of the robot 20.

The robot control program may be provided by being stored in a computer-readable storage medium such as the RAM 10b or the ROM 10c, or may be provided via a communication network connected by the communication unit 10d. In the robot control apparatus 10, as a result of the CPU 10a executing the robot control program, various motions that are described using FIG. 1 are realized. Note that these physical constituent elements are merely an example, and need not be independent constituent elements. For example, the robot control apparatus 10 may also include an LSI (large-scale integration) circuit that integrates the CPU 10a, the RAM 10b, and the ROM 10c.

3. Exemplary Operations

Figure 3:
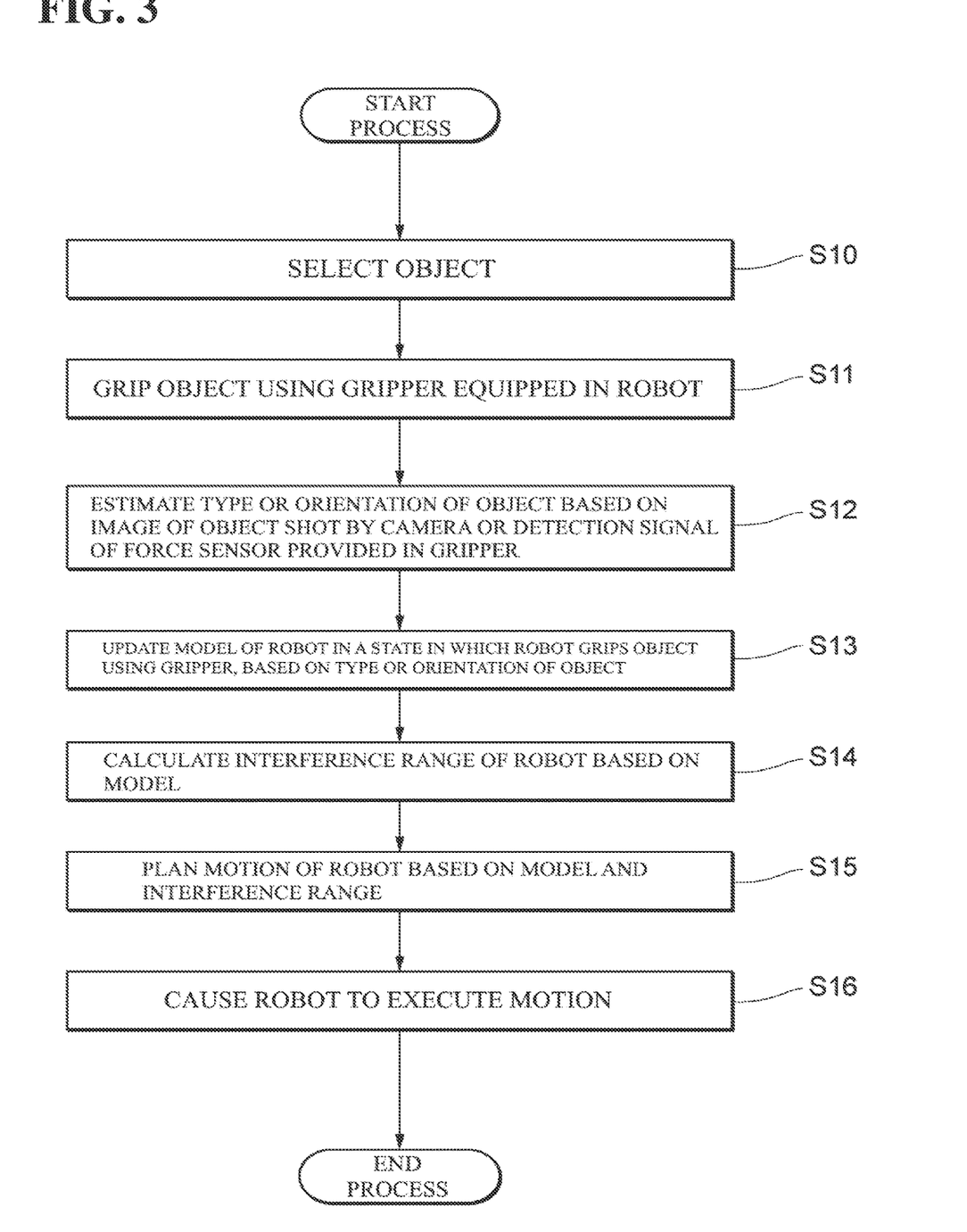
FIG. 3 is a flowchart illustrating a first exemplary robot control process to be executed by a robot control apparatus according to one or more embodiments the present embodiment.

FIG. 3 is a flowchart of a first exemplary robot control process to be executed by the robot control apparatus 10 according to the present embodiment. First, the robot control apparatus 10 selects an object (S10). The robot control apparatus 10 may receive designation of a motion (or activity) that the robot 20 is caused to perform, and select a tool needed for the designated motion (or activity).

Next, the robot control apparatus 10 grips the object using the gripper 21 with which the robot 20 is equipped (S11). Then, the robot control apparatus 10 estimates the type or orientation of the object based on an image of the object shot by the camera 22 or a detection signal of the force sensor provided in the gripper 21 (S12).

Thereafter, the robot control apparatus 10 updates the model of the robot 20 in a state in which the object is gripped by the gripper 21, based on the type or orientation of the object (S13). Also, the robot control apparatus 10 calculates the interference range of the robot 20 based on the model (S14).

Finally, the robot control apparatus 10 plans the motion of the robot 20 based on the model and the interference range (S15), and causes the robot 20 to execute the motion (S16) in accordance with the plan.

Figure 4:
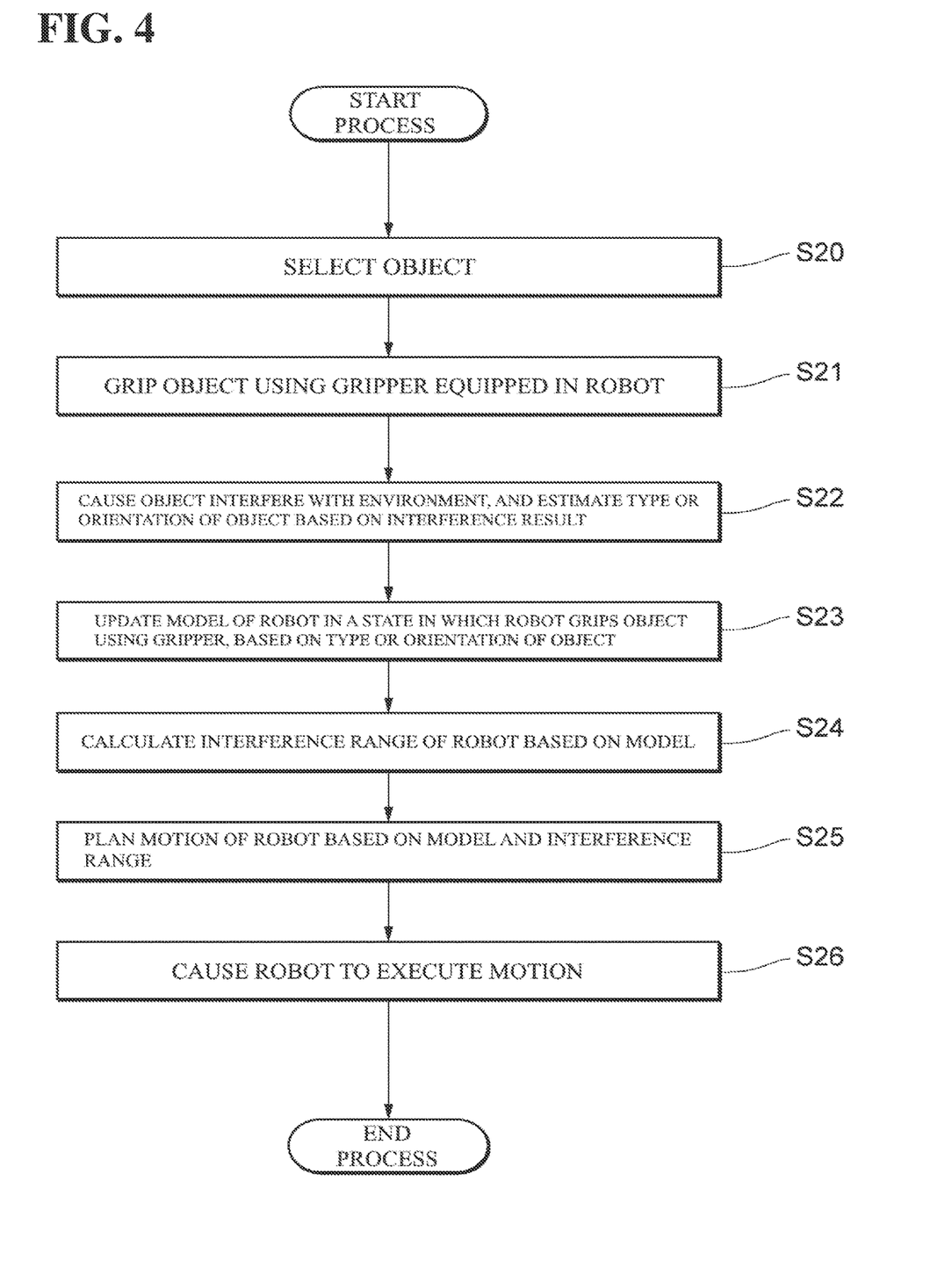
FIG. 4 is a flowchart illustrating a second exemplary robot control process to be executed by a robot control apparatus according to one or more embodiments the present embodiment.

FIG. 4 is a flowchart of a second exemplary robot control process to be executed by the robot control apparatus 10 according to the present embodiment. First, the robot control apparatus 10 selects an object (S20). The robot control apparatus 10 may receive designation of a motion that the robot 20 is caused to perform, and select a tool needed for the designated motion.

Next, the robot control apparatus 10 grips the object using the gripper 21 with which the robot 20 is equipped (S21). Then, the robot control apparatus 10 causes the object to interfere with its environment, and estimates the type or orientation of the object based on the interference result (S22).

Thereafter, the robot control apparatus 10 updates the model of the robot 20 in a state in which the object is gripped by the gripper 21, based on the type or orientation of the object (S23). Also, the robot control apparatus 10 calculates the interference range of the robot 20 based on the model (S24).

Finally, the robot control apparatus 10 plans the motion of the robot 20 based on the model and the interference range (S25), and causes the robot 20 to execute the motion (S26) in accordance with the plan.

The embodiment of the present invention can also be described as in the following notes. Note that the embodiment of the present invention is not limited to the modes described in the following notes. Also, the embodiment of the present invention may be a mode obtained by replacing features between notes or combining features.

Note 1

A robot control apparatus including:
a calculating unit configured to calculate an interference range of a robot based on a model of the robot in a state in which an object is gripped by a gripper with which the robot is equipped; and
a planning unit configured to plan a motion of the robot based on the model and the interference range.

Note 2

The robot control apparatus according to Note 1, further including:
an estimating unit configured to estimate the type of the object gripped by the gripper,
wherein the calculating unit is configured to update the model based on the type of the object.

Note 3

The robot control apparatus according to Note 1 or 2, further including:
an estimating unit configured to estimate the orientation of the object gripped by the gripper,
wherein the calculating unit is configured to update the model based on the orientation of the object.

Note 4

The robot control apparatus according to Note 2 or 3, wherein the robot includes a camera, and
the estimating unit is configured to estimate the type or orientation of the object based on an image of the object shot by the camera.

Note 5

The robot control apparatus according to any one of Notes 2 to 4,
wherein the robot includes a force sensor provided in the gripper, and
the estimating unit is configured to estimate the type or orientation of the object based on a detection signal of the force sensor.

Note 6

The robot control apparatus according to any one of Notes 2 to 5, wherein the estimating unit is configured to cause the object to interfere with its environment in a state in which the object is gripped by the gripper, and estimate the type or orientation of the object based on an interference result.

Note 7

The robot control apparatus according to any one of Notes 1 to 6, wherein the object is a tool.

Note 8

A robot control system including:
a robot equipped with a gripper for gripping an object; and
a robot control apparatus configured to control the robot,
wherein the robot control apparatus includes:
a calculating unit configured to calculate an interference range of the robot (20) based on a model of the robot in a state in which an object is gripped by the gripper with which the robot is equipped; and
a planning unit configured to plan a motion of the robot based on the model and the interference range.

Note 9

A robot control method for causing a processor included in a robot control apparatus to execute:
calculating an interference range of a robot based on a model of the robot in a state in which the robot grips an object using a gripper; and
planning a motion of the robot based on the model and the interference range.

Note 10
A robot control program for causing a processor included in a robot control apparatus to function as:
 a calculating unit configured to calculate an interference range of a robot based on a model of the robot in a state in which an object is gripped by a gripper with which the robot is equipped; and
 a planning unit configured to plan a motion of the robot based on the model and the interference range.

INDEX TO THE REFERENCE NUMERALS

10 Robot control apparatus
10*a* CPU
10*b* RAM
10*c* ROM
10*d* Communication unit
10*e* Input unit
10*f* Display unit
11 Calculating unit
12 Planning unit
13 Estimating unit
14 CAD memory
15 Tool designating unit
20 Robot
21 Gripper
22 Camera
30 Tool group
100 Robot control system

The invention claimed is:

1. A robot control apparatus comprising a processor configured with a program to perform operations comprising:
 calculating an interference range of a robot based on a model of the robot simulating motion of the robot in a virtual space, in a state in which an object is gripped by a gripper with which the robot is equipped; and
 planning a motion of the robot based on the model of motion of the robot in the virtual space and the interference range, wherein the interference range of the robot is calculated by:
  calculating angles of a plurality of joints of the robot; and
  calculating a leading end position of the object gripped by the gripper from the calculated angles.

2. The robot control apparatus according to claim 1, wherein the processor is configured with the program to perform operations:
 further comprising estimating a type of the object gripped by the gripper; and
 such that calculating the interference range of the robot comprises updating the model based on a type of the object.

3. The robot control apparatus according to claim 2, wherein
 the robot comprises a camera, and
 the processor is configured with the program to perform operations such that estimating the type of the object comprises estimating the type or an orientation of the object based on an image of the object shot by the camera.

4. The robot control apparatus according to claim 3, wherein
 the robot comprises a force sensor provided in the gripper, and
 the processor is configured with the program to perform operations such that estimating the type or the orientation of the object comprises estimating the type or the orientation of the object based on a detection signal of the force sensor.

5. The robot control apparatus according to claim 3, wherein the processor is configured with the program to perform operations such that estimating the type or the orientation of the object comprises causing the object to interfere with its environment in a state in which the object is gripped by the gripper, and estimating the type or the orientation of the object based on an interference result.

6. The robot control apparatus according to claim 3, wherein the object is a tool.

7. The robot control apparatus according to claim 2, wherein the robot comprises a force sensor provided in the gripper, and
 the processor is configured with the program to perform operations such that estimating the type of the object comprises estimating the type or an orientation of the object based on a detection signal of the force sensor.

8. The robot control apparatus according to claim 7, wherein the processor is configured with the program to perform operations such that estimating the type or the orientation of the object comprises causing the object to interfere with its environment in a state in which the object is gripped by the gripper, and estimating the type or the orientation of the object based on an interference result.

9. The robot control apparatus according to claim 2, wherein the processor is configured with the program to perform operations such that estimating the type of the object comprises causing the object to interfere with its environment in a state in which the object is gripped by the gripper, and estimating the type or an orientation of the object based on an interference result.

10. The robot control apparatus according to claim 2, wherein the processor is configured with the program to perform operations:
 further comprising estimating an orientation of the object gripped by the gripper; and
 such that calculating the interference range of the robot comprises updating the model based on the orientation of the object.

11. The robot control apparatus according to claim 2, wherein the object is a tool.

12. The robot control apparatus according to claim 1, wherein the processor is configured with the program to perform operations:
 further comprising estimating an orientation of the object gripped by the gripper; and
 such that calculating the interference range of the robot comprises updating the model based on the orientation of the object.

13. The robot control apparatus according to claim 12, wherein
 the robot comprises a camera, and
 the processor is configured with the program to perform operations such that estimating the orientation of the object comprises estimating a type or the orientation of the object based on an image of the object shot by the camera.

14. The robot control apparatus according to claim 12, wherein
 the robot comprises a force sensor provided in the gripper, and
 the processor is configured with the program to perform operations such that estimating the orientation of the object comprises estimating a type or the orientation of the object based on a detection signal of the force sensor.

15. The robot control apparatus according to claim 12, wherein the processor is configured with the program to perform operations such that estimating the orientation of the object comprises causing the object to interfere with its environment in a state in which the object is gripped by the gripper, and estimating a type or the orientation of the object based on an interference result.

16. The robot control apparatus according to claim 12, wherein the object is a tool.

17. The robot control apparatus according to claim 1, wherein the object is a tool.

18. A robot control system comprising:
   a robot equipped with a gripper for gripping an object; and
   the robot control apparatus according to claim 1.

19. A robot control method for causing a processor comprised in a robot control apparatus to perform operations comprising:
   calculating an interference range of a robot based on a model of the robot simulating motion of the robot in a virtual space, in a state in which the robot grips an object using a gripper; and
   planning a motion of the robot based on the model of motion of the robot in the virtual space and the interference range, wherein
   the interference range of the robot is calculated by:
      calculating angles of a plurality of joints of the robot; and
      calculating a leading end position of the object gripped by the gripper from the calculated angles.

20. A non-transitory computer-readable storage medium storing a robot control program, which when read and executed, causes a processor comprised in a robot control apparatus to perform operations comprising:
   calculating an interference range of a robot based on a model of the robot simulating motion of the robot in a virtual space, in a state in which an object is gripped by a gripper with which the robot is equipped; and
   planning a motion of the robot based on the model of motion of the robot in the virtual space and the interference range, wherein
   the interference range of the robot is calculated by:
      calculating angles of a plurality of joints of the robot; and
      calculating a leading end position of the object gripped by the gripper from the calculated angles.

* * * * *